(12) United States Patent
Naito et al.

(10) Patent No.: US 12,722,332 B2
(45) Date of Patent: Sep. 1, 2026

(54) INJECTION MOLDING MACHINE FOR FOAM MOLDING

(71) Applicant: THE JAPAN STEEL WORKS, LTD., Tokyo (JP)

(72) Inventors: Akihiro Naito, Tokyo (JP); Takuya Yufu, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 656 days.

(21) Appl. No.: 17/751,000

(22) Filed: May 23, 2022

(65) Prior Publication Data

US 2022/0402177 A1 Dec. 22, 2022

(30) Foreign Application Priority Data

Jun. 14, 2021 (JP) ................................ 2021-098459

(51) Int. Cl.
*B29C 44/34* (2006.01)
*B29C 45/00* (2006.01)
(Continued)

(52) U.S. Cl.
CPC ...... *B29C 44/3402* (2016.11); *B29C 44/3446* (2013.01); *B29C 45/0001* (2013.01);
(Continued)

(58) Field of Classification Search
CPC ............ B29C 44/3402; B29C 44/3446; B29C 45/0001; B29C 45/1701; B29C 45/60;
(Continued)

(56) References Cited

U.S. PATENT DOCUMENTS 3,856,442 A * 12/1974 Gallagher ........... B29C 44/3442 425/208
3,976,730 A * 8/1976 Cushing .................. B29C 48/29 264/17

(Continued)

FOREIGN PATENT DOCUMENTS

CN 110914033 A 3/2020
JP 54-20467 Y2 7/1979

(Continued)

OTHER PUBLICATIONS

JP-2019018522-A (Year: 2019).*

(Continued)

*Primary Examiner* — Xiao S Zhao
(74) *Attorney, Agent, or Firm* — Sughrue Mion, PLLC

(57) ABSTRACT

An injection molding machine for foam molding includes: a heating cylinder; a screw disposed in the heating cylinder; and a plurality of inlet portions provided in the heating cylinder and configured to introduce inert gas. An inside of the heating cylinder includes a starvation section on an upstream side in which a pressure of the resin is decreased, and the inert gas from the plurality of inlet portions being to be supplied in the starvation section. Each of the plurality of inlet portions is provided with a check valve or an opening and closing mechanism. A product P×N of an interval P of the plurality of inlet portions and a number N of the inlet portions is 0.5H or more and 1.71H or less with respect to a length H of the starvation section.

7 Claims, 1 Drawing Sheet

(51) Int. Cl.

*B29C 45/17* (2006.01)
*B29C 45/60* (2006.01)
*B29C 45/62* (2006.01)
*B29C 45/74* (2006.01)
*B29K 105/04* (2006.01)

(52) U.S. Cl.

CPC .......... *B29C 45/1701* (2013.01); *B29C 45/60* (2013.01); *B29C 45/62* (2013.01); *B29C 45/74* (2013.01); *B29K 2105/04* (2013.01)

(58) Field of Classification Search

CPC . B29C 45/62; B29C 45/74; B29C 2045/1722; B29C 44/42; B29C 44/02; B29C 44/34; B29C 44/3415; B29C 44/422; B29C 44/424; B29C 44/425; B29C 45/14795; B29C 45/2806; B29K 2105/04

See application file for complete search history.

(56) References Cited

U.S. PATENT DOCUMENTS 4,389,358 A * 6/1983 Hendry ............... B29C 45/1615 264/DIG. 83
7,144,532 B2 * 12/2006 Kim ........................ B29C 48/92 264/53
10,632,663 B2 * 4/2020 Yusa ....................... B29C 48/53
2003/0011090 A1 * 1/2003 Yamaki ................... B29C 45/60 261/DIG. 26
2004/0253335 A1 * 12/2004 Anderson ............... B29B 7/429 425/208
2005/0089595 A1 * 4/2005 Blach .................. B29C 48/2517 425/208
2005/0098925 A1 * 5/2005 Puniello .............. B29C 45/2608 264/328.1
2005/0109419 A1 * 5/2005 Ohmi ..................... B01D 53/68 222/3
2011/0147975 A1 * 6/2011 Fujio .................. B29C 44/3446 264/50
2017/0043503 A1 * 2/2017 Suzuki .................... B29C 45/34
2018/0117823 A1 5/2018 Yusa et al.
2018/0339439 A1 11/2018 Yusa et al.
2020/0123341 A1 * 4/2020 Morio ..................... B29C 45/00
2020/0223122 A1 7/2020 Yusa et al.

FOREIGN PATENT DOCUMENTS

JP 2019-18522 A 2/2019
JP 2019018522 A * 2/2019 ............. B29C 45/00
JP 2019-177696 A 10/2019
JP 2020-157774 A 10/2020
JP 2021-24242 A 2/2021

OTHER PUBLICATIONS

JP-2019018522-A detailed translation from WIPO (Year: 2024).*
Office Action issued Oct. 1, 2024 by the Japanese Patent Office in Japanese Patent Application No. 2021-098459.
Communication issued on Apr. 24, 2026 by the China National Intellectual Property Administration in Chinese Patent Application No. 202210651295.3.

* cited by examiner 1
2
3
5
6
8
9
10
13
14
15
H
P
17
18
20
21
22

INJECTION MOLDING MACHINE FOR FOAM MOLDING

CROSS-REFERENCE TO RELATED APPLICATIONS

This application is based on and claims priority under 35 USC 119 from Japanese Patent Application No. 2021-098459 filed on Jun. 14, 2021, the contents of which are incorporated herein by reference.

TECHNICAL FIELD

The present disclosure relates to an injection molding machine for use in foam molding in which inert gas is introduced into a molten resin to be injected into a mold to obtain a foam molded product.

BACKGROUND ART

A molded product containing a large number of fine bubbles inside, that is, a foam molded product, is not only lightweight but also excellent in strength, and has a wide range of applications. In order to obtain the foam molded product by injection molding, it is necessary to mix a foaming agent with a resin. When a physical foaming agent is selected as the foaming agent, inert gas such as nitrogen or carbon dioxide is used. When the inert gas is used as the foaming agent, the inert gas is introduced into a molten resin in a heating cylinder and is kneaded and dissolved in the resin. Then, the inert gas is saturated in the resin. When the obtained resin is injected into a mold, a pressure is released in the resin and the inert gas becomes bubbles. When the resin is cooled and solidified, the foam molded product is obtained. When the foam molded product is molded with the inert gas, there is also a method of introducing the inert gas in a supercritical state at a high pressure and a high temperature, but so-called low pressure foam molding method of introducing the inert gas having a relatively low pressure to obtain the foam molded product is also known. In a case of performing the low pressure foam molding method, as in injection molding machines disclosed in JP 2019-177696 A (PTL 1) and JP 2019-18522 A (PTL 2), a groove depth of a screw is increased in a predetermined section of the screw, thereby decreasing a pressure of the molten resin in the heating cylinder. That is, a starvation section is formed. A gas inlet port of the inert gas is provided in the heating cylinder so as to correspond to the starvation section, and the inert gas is introduced into the gas inlet port. In the starvation section, the inert gas permeates into the molten resin.

SUMMARY

In an injection molding machine in which low pressure foam molding is performed, since introduction of inert gas can be performed at a low pressure, an inert gas inlet device can be simply configured and can be provided at low cost, which is excellent. However, there are points that need to be improved. Specifically, there is a problem that a length of a screw or a heating cylinder is relatively long. As described above, in the injection molding machine for the low pressure foam molding, the starvation section is formed in the heating cylinder, and the inert gas is introduced in the starvation section, but the screw is moved backward as measurement progresses. The starvation section needs to be long enough to allow continuous introduction of the inert gas even when the screw is moved backward, and to prevent a resin from entering from a gas inlet port of the inert gas. That is, it is necessary to secure the starvation section that is sufficiently longer than a length of the screw moving backward due to the measurement, that is, a measurement stroke. Therefore, in the injection molding machine for the low pressure foam molding, there is a problem that the screw and the heating cylinder are inevitably long, and a machine length is long. When gas inlet ports of the inert gas are provided at two or more places spaced apart from each other in an axial direction in the heating cylinder, the starvation section may be shortened. That is, this is because the introduction of the inert gas can be continued if any gas inlet port of the inert gas at one place is positioned in the starvation section regardless of positions of forward movement and backward movement of the screw, and entering of the resin can be prevented by closing the gas inlet port at the other place with a valve. It can be said that the injection molding machine disclosed in PTL 2 is an injection molding machine in which the gas inlet ports of the inert gas are provided at two places spaced apart from each other in the axial direction in the heating cylinder thus, and the starvation section can be shortened. However, PTL 2 does not specifically disclose at what intervals the two or more gas inlet ports should be provided or how much the starvation section can be shortened. Then, the machine length cannot be sufficiently shortened. PTL 1 discloses that a length of the starvation section is six times a screw diameter. However, the length of the starvation section is not determined on the assumption that the gas inlet ports of the inert gas are provided at a plurality of positions. Further, although it is expected that the length of the starvation section relates to the measurement stroke, there is no description of relationship between the starvation section and the measurement stroke. In any case, from the description of PTLs 1 and 2, when two or more gas inlet ports are provided, there is no description of how the interval of the two or more gas inlet ports should be set in the relationship between the starvation section and the measurement stroke. Therefore, the starvation section cannot be sufficiently shortened and the machine length of the injection molding machine cannot be shortened.

Illustrative aspects of the present disclosure provide an injection molding machine in which a starvation section is formed in a heating cylinder, and inert gas having a relatively low pressure is introduced into a molten resin to mold a foam molded product, in which the inert gas can be stably introduced and a machine length is sufficiently short.

Other problems and novel features will become apparent from the description of this specification and the accompanying drawings.

In the present disclosure, a plurality of inlet portions that introduce inert gas are provided in an injection molding machine for foam molding, and a check valve or an opening and closing mechanism is provided in the inlet portions. A heating cylinder is divided into a first stage on an upstream side and a second stage on a downstream side in accordance with a shape of a screw, the first stage includes, from upstream to downstream, a supply section in which a resin is melted, a first compression section in which the resin is compressed, and a first measurement section in which the resin is sent, and the second stage includes, from upstream to downstream, a starvation section, a second compression section, and a second measurement section. In the present disclosure, a product $P \times N$ of an interval P of the plurality of inlet portions and a number N of the inlet portions is 0.5H or more and 1.71H or less with respect to a length H of the starvation section. Accordingly, a machine length is shortened. In another disclosure, the length H of the starvation section is 0.7S or more and 1.2S or less with respect to a measurement stroke S, which is a length of the screw moving backward at the time of measurement. Further, in another disclosure, the plurality of inlet portions are provided with an opening and closing mechanism, and the opening and closing mechanism is controlled to be opened and closed based on a position of the screw.

According to the present disclosure, the product P×N of the interval P of the plurality of inlet portions and the number N of the inlet portions is 0.5H or more and 1.71H or less with respect to the length H of the starvation section, so that it is guaranteed that at least one inlet portion is positioned in the starvation section even when the screw is moved backward at the time of the measurement. That is, it is guaranteed that the inert gas can be stably supplied. The inlet portion is provided with the check valve or the opening and closing mechanism. When the screw moves backward at the time of the measurement, any one of the plurality of inlet portions is out of the starvation section, but there is a risk that resin will enter in such inlet portion. However, since the check valve or the opening and closing mechanism is provided, backflow of the resin can be reliably prevented. Since the starvation section has a short length, the machine length can be shortened. According to another disclosure, the length H of the starvation section is 0.7S or more and 1.2S or less with respect to the measurement stroke S, which is the length of the screw moving backward at the time of the measurement. Since the length H of the starvation section is thus short, a length of the screw is short, and the machine length of the injection molding machine is short. Further, according to another disclosure, the plurality of inlet portions are provided with the opening and closing mechanism, and the opening and closing mechanism is controlled to be opened and closed based on the position of the screw. Then, a screw position where the inlet portion is out of the starvation section is memorized, and when the screw reaches the screw position, the opening and closing mechanism is closed, so that the backflow of the resin can be reliably prevented.

BRIEF DESCRIPTION OF DRAWINGS

FIGS. 1A and 1B are diagrams showing an injection molding machine for foam molding according to an illustrative embodiment of the present disclosure, in which FIG. 1A is a front sectional view of the injection molding machine showing a state where a screw is moved most forward, and FIG. 1B is a front sectional view of the injection molding machine showing a state where the screw is moved most backward by measurement.

DETAILED DESCRIPTION

Figures 1A, 1B:
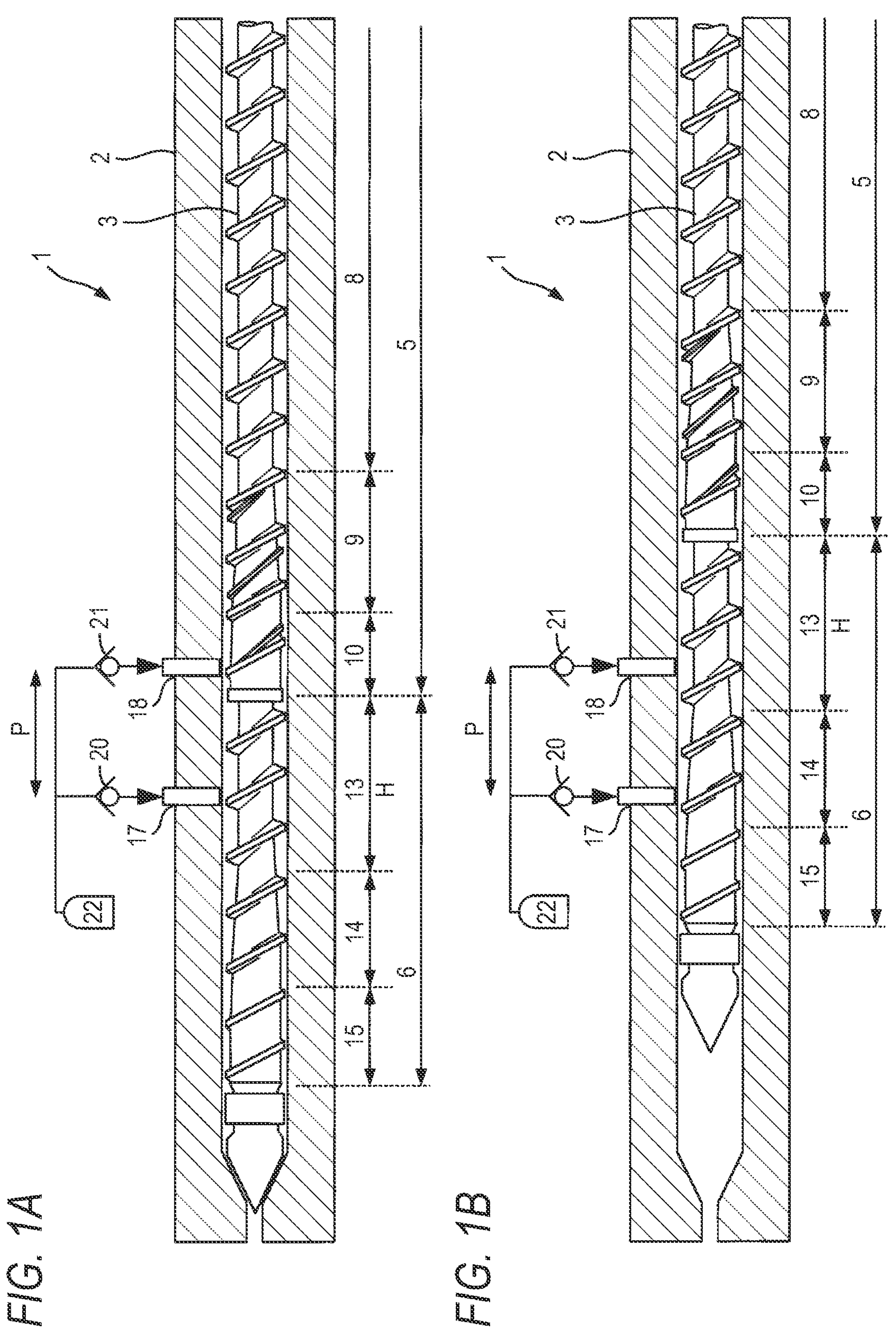

Hereinafter, a specific illustrative embodiment will be described in detail with reference to the drawings. However, the present disclosure is not limited to the following illustrative embodiment. In order to clarify the description, the following description and the drawings are simplified as appropriate. In all the drawings, the same elements are denoted by the same reference signs, and repetitive descriptions thereof are omitted. In addition, there is a portion where hatching is omitted such that the drawing is not complicated.

Hereinafter, the illustrative embodiment of the present disclosure will be described. As shown in FIGS. 1A and 1B, an injection molding machine 1 according to the illustrative embodiment of the present disclosure includes a heating cylinder 2, and a screw 3 that can be driven in a rotational direction and an axial direction in the heating cylinder 2. The heating cylinder 2 is provided with a hopper on a rear side, that is, on an upstream side, and an injection nozzle is provided on a front side, that is, on a downstream side. A plurality of band heaters are wound around an outer peripheral surface of the heating cylinder 2, but these plurality of band heaters are not shown in the drawings.

The injection molding machine 1 according to the present illustrative embodiment is an injection molding machine for performing a so-called low pressure foam molding method for molding a foam molded product by introducing inert gas having a relatively low pressure. Therefore, the screw 3 according to the present illustrative embodiment has a structure suitable for the low pressure foam molding method. First, the screw 3 can be roughly divided into a first stage 5 on the upstream side and a second stage 6 on the downstream side. The first stage 5 has a supply section 8 in which a groove depth of the screw is large from the upstream side to a middle side, and a resin supplied from the hopper is melted and sent forward. A first compression section 9 in which the groove depth of the screw gradually decreases is formed on a downstream side of the supply section 8. The first compression section 9 is a section in which the molten resin is compressed and sent forward. Then, a constant first measurement section 10 having a small groove depth of the screw is formed in the most downstream portion of the first stage 5, and the compressed resin is sent forward. In the present illustrative embodiment, a so-called barrier flight is formed in the first compression section 9 and the first measurement section 10. That is, the first compression section 9 and the first measurement section 10 are formed of a main flight having a predetermined pitch and lead angle and a sub flight having a pitch and lead angle larger than those of the main flight. Therefore, backflow of the resin is unlikely to occur in the first compression section 9 and the first measurement section 10. The first compression section 9 and the first measurement section 10 may be formed from other types of flights such as a single flight. A starvation section 13 is formed on an upstream side of the second stage 6. The starvation section 13 has a large groove depth of the screw and a constant depth, so that a pressure of the molten resin decreases. As described below, the inert gas is supplied in the starvation section 13 and is melted in the resin, and permeates into the molten resin and dissolves in the molten resin. The injection molding machine 1 according to the present illustrative embodiment is characterized by a length H of the starvation section 13, but will be described later. A second compression section 14 in which the groove depth of the screw gradually decreases is formed downstream of the starvation section 13, and the molten resin in which the inert gas is dissolved is sent while being compressed and kneaded. Then, a constant second measurement section 15 having a small groove depth of the screw is formed in the most downstream portion of the second stage 6, and the molten resin permeated with the inert gas is sent forward. An intermediate region may be provided between the first measurement section 10 and the starvation section 13 for the purpose of adjusting the pressure and the like.

Gas inlet ports (one example of inlet portions) 17 and 18 into which the inert gas is introduced are provided in the heating cylinder 2. The present illustrative embodiment is characterized in that the first gas inlet port 17 and the second gas inlet port 18 having a number N of two are provided at positions spaced apart from each other in the axial direction, and an interval P of the first gas inlet port 17 and the second gas inlet port 18. As shown in FIG. 1A, the first gas inlet port 17 is provided at a position corresponding to the starvation section 13 in a state in which the screw 3 is moved most forward. On the other hand, the second gas inlet port 18 is provided on an upstream side of the first gas inlet port 17, and is provided at a position corresponding to the first stage 5 in the present illustrative embodiment. More preferably, the second gas inlet port 18 is provided on a downstream side of the first measurement section 10. Since the first gas inlet port 17 and the second gas inlet port 18 are provided thus, as shown in FIG. 1B, even when the screw 3 is moved backward at the time of measurement and the first gas inlet port 17 is out of the starvation section 13, the second gas inlet port 18 enters the starvation section 13, and the introduction of the inert gas can be continued. In the present disclosure, the number N of the first gas inlet port 17 and the second gas inlet port 18 and the interval P of the first gas inlet port 17 and the second gas inlet port 18 are related to the length H of the starvation section 13 so that the introduction of the inert gas can be stably performed, which will be described later. The first gas inlet port 17 and the second gas inlet port 18 include check valves 20 and 21, respectively, and are connected to a cylinder 22 for supplying the inert gas. Although the check valves 20 and 21 in the drawings are shown to be provided at positions spaced apart from the gas inlet ports 17 and 18, the check valves 20 and 21 may be actually incorporated into the gas inlet ports 17 and 18.

In the injection molding machine 1 according to the present illustrative embodiment, the number N of the first gas inlet port 17 and the second gas inlet port 18 and the interval P of the first gas inlet port 17 and the second gas inlet port 18 are specified in relation to the length H of the starvation section 13, and the first gas inlet port 17 and the second gas inlet port 18 and the starvation section 13 are also specified in relation to a measurement stroke S. Further, some points are specified. In the description of these points, a point is considered in design in an injection molding machine in the related art in order to stably introduce the inert gas into the molten resin, and a problem in the related art will be described.

In a case of the injection molding machine for foam molding in the related art, at a start portion and an end portion of a starvation section, there is a region where the pressure of the resin changes from a high state to a low state or from the low state to the high state, that is, a transition region of a portion filled with the resin and a portion where a starvation state is formed. In this transition region, since the gas cannot permeate sufficiently, in a case where a gas supply port does not have an opening and closing mechanism, when the screw moves forward and backward and the gas supply port approaches the transition region, the molten resin enters the gas supply port, and the gas cannot be supplied. If this state continues, foam molding cannot be continued, and therefore maintenance such as cleaning of the gas supply port is required. In the present disclosure, by providing the opening and closing mechanism in a gas flow path like the check valves 20 and 21 in the first gas inlet port 17 and the second gas inlet port 18, it is possible to prevent the molten resin from entering even when the gas supply port approaches the transition region. However, the gas cannot be supplied during this period, which may cause a defect such as a decrease in an amount of gas dissolved. A length of the transition region varies depending on a shape of the screw, a viscosity of the resin at the time of measurement, a measurement condition such as a screw rotation speed, and the like. Due to presence of the transition region, it is not possible to obtain a high-quality foam molded product only by making at least one gas supply port always present in the starvation section during the measurement. During the measurement, at least one gas supply port needs to be present in a range on an inner side within a specific length from two ends of the starvation section. Specifically, the specific length may be a distance that the resin advances during 0.5 rotation of the screw, and more preferably a distance that the resin advances during one rotation of the screw. Usually, since a pitch of a screw flight is often around 1D with a screw diameter as D, the specific length is 0.5D, and more preferably 1D. That is, during the measurement, at least one gas inlet valve port is present on the inner side in a range of 0.5D or 1D or more from the two ends of the starvation section. Then, it is possible to prevent the gas supply port from approaching the transition region. Accordingly, in the injection molding machine in the related art, the inert gas can be efficiently and stably supplied to the molten resin. That is, in the injection molding machine in the related art, a length of the starvation section is designed to be 0.5D or more before and after the stroke S, more preferably 1D or more, that is, S+1D or more, and more preferably S+2D or more, with respect to the stroke S. However, in such a design in the related art, the starvation section needs to be long with respect to the required measurement stroke S. Therefore, there is a problem that an entire machine length becomes long.

The injection molding machine 1 according to the present illustrative embodiment solves the problem in the related art by providing a plurality of requirements. First, a product P×N of the interval P of the first gas inlet port 17 and the second gas inlet port 18 and the number N of the first gas inlet port 17 and the second gas inlet port 18 is 0.5H or more and 1.71H or less with respect to the length H of the starvation section 13. The interval P of the first gas inlet port 17 and the second gas inlet port 18 is 0.25S or more and 0.8S or less with respect to the measurement stroke S. In the present illustrative embodiment, the number N of the first gas inlet port 17 and the second gas inlet port 18 is two, but the inert gas can be reliably introduced by increasing the number of gas inlet ports and narrowing the interval P. Therefore, the length H of the starvation section 13 can be shortened. Accordingly, the length H of the starvation section 13 is 0.7S or more and 1.2S or less with respect to the measurement stroke S, which is a length of the screw 3 moving backward at the time of measurement. This is a length that could not be implemented by the injection molding machine for foam molding in the related art. Further, the product P×N of the interval P of the first gas inlet port 17 and the second gas inlet port 18 and the number N of the first gas inlet port 17 and the second gas inlet port 18 is 0.5S or more and 1.6S or less with respect to the measurement stroke S. Accordingly, the inert gas can be efficiently and stably supplied to the molten resin, and the machine length is reduced.

In the present illustrative embodiment, the number N of the gas inlet ports of the inert gas is two, that is, the first gas inlet port 17 and the second gas inlet port 18, but may be three or more. However, when the number of the gas inlet ports is increased too much, cost is increased, and thus it is desirable to set the number of the gas inlet ports to four or less.

EXAMPLE

An experiment was performed to confirm that the injection molding machine 1 according to the present illustrative embodiment can stably perform the foam molding.

Experimental Method

First, reference conditions were set as follows. (A dimension and a length of each part are indicated by a ratio with the measurement stroke S.)

Screw diameter D: 84 mm (0.2S)

Measurement stroke S: 420 mm (injection capacity is about 2,327 $cm^3$)

Length H of starvation section 13: 420 mm (1.0S)

Number N of gas inlet ports of inert gas: two

Valve mechanism of gas inlet port: check valve

Interval P of gas inlet ports: 252 mm (0.6S)

Resin used: PP resin

Then, a purge test was performed under the same conditions as those of the above reference conditions, or a purge test was performed by changing some of the conditions, and it was confirmed whether a good foam state was obtained. At this time, the N gas inlet ports 17, 18, and so on are disposed at equal pitches in the heating cylinder 2. In addition, when the screw 3 moves by half of the measurement stroke S, that is, when the screw 3 moves backward by 0.5S, the gas inlet ports 17, 18, and so on are disposed such that a position of a center of the starvation section 13 of the screw 3 in the heating cylinder 3 and a position of a center of the N gas inlet ports 17, 18, and so on coincide with each other. Test was performed on Examples 1 to 10 satisfying specified conditions in the present disclosure and Comparative Examples 1 to 8 not satisfying the specified conditions.

Example 1: An injection molding machine having the same condition as the reference condition was prepared, and a purge test was performed with the measurement stroke S as the reference condition. In an obtained sample, foaming was uniformly formed and good.

Example 2: Among the reference conditions, the purge test was performed by changing the interval of the gas inlet ports 17 and 18 to 0.8S. The two gas inlet ports 17 and 18 were disposed such that at least one of the gas inlet ports 17 and 18 was always within the starvation section 13 and was present on the inner side at 0.1S or more from the two ends of the starvation section 13 during the measurement. Specifically, the gas inlet port 17 on one hand is disposed in the heating cylinder 2 so that the gas inlet port 17 is positioned on the downstream side by 0.1S from an end portion on an upstream side of the starvation section 13 at the start of the measurement, and the gas inlet port 18 on the other hand is disposed in the heating cylinder 2 so that the gas inlet port 18 is positioned on the upstream side by 0.1S from an end portion on a downstream side of the starvation section 13 at the time of completion of the measurement. During a period from the start to the completion of the measurement stroke, the gas inlet port is always disposed on the inner side with respect to these positions. In an obtained sample, foaming was uniformly formed and good.

Example 3: Among the reference conditions, the length H of the starvation section 13 was 0.8S, the number N of the gas inlet ports 17, 18, and so on was three and spaced apart in the axial direction, the interval P of the adjacent gas inlet ports 17, 18, and so on was 0.4S, and the purge test was performed. By shortening the length H of the starvation section 13 by 0.2S from the reference condition, the machine length became 0.2S short. In an obtained sample, foaming was uniformly formed and good.

Example 4: Among the reference conditions, the check valves 20 and 21 were replaced with other valves. That is, the gas inlet ports 17 and 18 with the check valves were merely holes (which may also be referred to as "gas inlet hole(s)"), and a needle type inlet valve that is opened and closed by air drive is provided in a pipeline that supplies the inert gas to the gas inlet holes. Other points were the same as the reference conditions, and the purge test was performed. Opening and closing of the inlet valve was switched based on a screw position. That is, when the gas inlet hole entered the inner side at 0.1S or more from the two ends of the starvation section 13, the inlet valve was opened, and when the gas inlet hole was out of the starvation section 13, the inlet valve was closed to prevent the backflow of the resin. In an obtained sample, foaming was uniformly formed and good.

Example 5: Conditions were similar as in Example 4. However, with respect to the opening and closing of the inlet valve, a condition is further added, and when the measurement is completed, all inlet valves are closed during a period from the completion of the measurement to start of next measurement. When the purge test was performed, a sample was obtained in which foaming was uniformly formed and good.

Example 6: In addition to the reference conditions, an automatic valve that opens and closes a flow path by receiving an electrical signal was interposed in a pipeline that supplies the inert gas to the gas inlet ports 17 and 18 with the check valves 20 and 21. That is, the opening and closing mechanism was provided. The opening and closing of the automatic valve was switched based on the screw position, when the gas inlet port entered the inner side at 0.1S or more from the two ends of the starvation section 13, the automatic valve was opened, and when the gas inlet hole was out of the starvation section 13, the automatic valve was closed to prevent the backflow of the resin. Accordingly, when the purge test was performed, a sample was obtained in which foaming was uniformly formed and good.

Example 7: The check valves 20 and 21 were removed under the reference condition. That is, the gas inlet ports 17 and 18 are mere gas inlet holes, and an automatic valve that opens and closes a flow path by receiving an electrical signal was interposed in a pipeline that supplies the inert gas to the gas inlet hole. That is, the opening and closing mechanism was provided. The opening and closing of the automatic valve was switched based on the screw position, when the gas inlet hole entered the inner side at 0.1S or more from the two ends of the starvation section 13, the automatic valve was opened, and when the gas inlet hole was out of the starvation section 13, the automatic valve was closed to prevent the backflow of the resin. In an obtained sample, foaming was uniformly formed and good.

Example 8: Among the reference conditions, the measurement stroke S was 350 mm. The length H of the starvation section 13 and the interval P of the gas inlet ports 17 and 18 were 420 mm and 252 mm respectively, which are reference conditions, but the measurement stroke S was shortened, so that the length H of the starvation section 13 and the interval P of the gas inlet ports 17 and 18 were 1.2S and 0.72S respectively. In an obtained sample, foaming was uniformly formed and good.

Example 9: Among the reference conditions, the interval P of the gas inlet ports 17 and 18 was 105 mm, that is, 0.25S. The product of the interval P of the gas inlet ports 17 and 18 and the number N of the gas inlet ports 17 and 18 was 0.5S with respect to the measurement stroke S and 0.5H with respect to the length H of the starvation section 13. When a sample was obtained under this condition, in an obtained sample, foaming was uniformly formed and good.

Example 10: Among the reference conditions, the length H of the starvation section 13 was 373 mm, that is, 0.9S, and the interval P of the gas inlet ports 17 and 18 was 189 mm, that is, 0.45S. When a sample was obtained under this condition, in an obtained sample, foaming was uniformly formed and good.

Example 11: Among the reference conditions, the length H of the starvation section 13 was 294 mm, that is, 0.7S, and the interval P of the gas inlet ports 17 and 18 was 126 mm, that is, 0.3S. In an obtained sample, foaming was uniformly formed and good.

Example 12: The screw diameter D was 40 mm, the measurement stroke S was 180 mm, the length H of the starvation section 13 was 180 mm, the interval P of the gas inlet ports 17, 18 was 120 mm, and the number N of the gas inlet ports 17, 18 was two. That is, the length H of the starvation section 13 is 1.0S, the interval P of the gas inlet ports 17 and 18 is 0.3S, which satisfies the conditions specified in the present disclosure. In a sample obtained by an experiment, foaming was uniformly formed and good.

Comparative Example 1: Among the reference conditions, the number N of the gas inlet ports of the inert gas was one, and the measurement stroke S was 252 mm. However, the gas inlet port was provided at a position of 42 mm (0.5D) from a start position of the starvation section at a start point of the measurement stroke (the similar applies when the number of gas inlet ports is 1 after Comparative Example 2 except for Comparative Example 8). The starvation section 13 has a length H of 1.7S, which does not satisfy the requirements of the present disclosure. The purge test was performed, and in an obtained sample, foaming was uniformly formed and good, but the injection capacity was only about 931 $cm^3$. That is, a sufficient injection amount was not obtained.

Comparative Example 2: Among the reference conditions, the number of the gas inlet ports of the inert gas was one, and the gas inlet port was replaced with a mere a hole (which may also be referred to as "gas inlet hole"). That is, the check valve was removed. Accordingly, the purge test was performed. However, a sample did not foam. As a result of examination, it was found that the gas inlet hole is clogged with the resin and the inert gas was not supplied. It is presumed that the gas inlet port goes out of the starvation section 13 during the measurement stroke.

Comparative Example 3: Among the reference conditions, the length H of the starvation section 13 was 672 mm, that is, 1.6S. In addition, the number of the gas inlet ports of the inert gas was one, and the gas inlet port was replaced with a mere gas inlet hole. That is, the check valve was removed. Accordingly, the purge test was performed. In an obtained sample, foaming was uniformly formed and good. Since the length H of the starvation section 13 is long, the gas inlet hole was guaranteed to always enter the starvation section 13, but the machine length was increased by 0.6S.

Comparative Example 4: Among the reference conditions, the gas inlet port of the inert gas was changed, and all gas inlet ports are replaced with mere gas inlet holes having no check valve. Accordingly, the purge test was performed. However, a sample did not foam. As a result of examination, the two gas inlet holes were clogged with the resin.

Comparative Example 5: Among the reference conditions, the interval P of the two gas inlet ports was increased to 420 mm, that is, 1.0 S. When the purge test was performed, bubbles in a sample were coarse and large. In a measurement process, it is expected that a timing occurs when the two gas inlet ports are both out of the starvation section 13, and accordingly, the inert gas does not sufficiently permeate into the molten resin.

Comparative Example 6: Among the reference conditions, the length H of the starvation section 13 was 168 mm, that is, 0.4S. Accordingly, the purge test was performed, but only a small amount of bubbles were formed in a sample.

Comparative Example 7: Among the reference conditions, the measurement stroke S was 350 mm. Accordingly, the length H of the starvation section 13 was 1.2S. In addition, the number of the gas inlet ports was one. The purge test was performed, but diameters of the bubbles formed in a sample increased.

Comparative Example 8: The screw diameter D was 40 mm, the measurement stroke S was 180 mm, and the length H of the starvation section 13 was 180 mm. In addition, the gas inlet port was provided at a position 20 mm (0.5D) from the start position of the starvation section at the start point of the measurement stroke, that is, the length H of the starvation section 13 is 1.0S, which satisfies the condition specified in the present disclosure. However, the number N of the gas inlet ports was one. The purge test was performed, but the diameters of the bubbles formed in a sample increased.

Experimental results are summarized in a following table.

TABLE 1

| Symbol | Screw diameter D | Measurement stroke S | Starvation section H | Inlet port of inert gas | Interval of inlet ports P | Number of inlet ports N | Position of inlet port in starvation section (*1) A | Foam state | Length of screw Entire machine length | H/S | P/S | P × N/S | P × N/H | A/S |
|---|---|---|---|---|---|---|---|---|---|---|---|---|---|---|
| Example 1 | 84 | 420 | 420 | CV | 252 | 2 | 84 | Good | Good Reference length | 1.0 | 0.6 | 1.2 | 1.2 | 0.2 |
| Example 2 | | 420 | 420 | CV | 336 | 2 | 42 | Good | Good | 1.0 | 0.8 | 1.6 | 1.6 | 0.1 |
| Example 3 | | 420 | 336 | CV | 168 | 3 | 84 | Good | Excellent Shorten by 0.2S | 0.8 | 0.4 | 1.2 | 1.5 | 0.2 |
| Example 4 | | 420 | 420 | IV | 252 | 2 | 84 | Good | Good | 1.0 | 0.6 | 1.2 | 1.2 | 0.2 |
| Example 5 | | 420 | 420 | IV | 252 | 2 | 84 | Good | Good | 1.0 | 0.6 | 1.2 | 1.2 | 0.2 |
| Example 6 | | 420 | 420 | CV + AV | 252 | 2 | 84 | Good | Good | 1.0 | 0.6 | 1.2 | 1.2 | 0.2 |
| Example 7 | | 420 | 420 | AV + OFP | 252 | 2 | 84 | Good | Good | 1.0 | 0.6 | 1.2 | 1.2 | 0.2 |
| Example 8 | | 350 | 420 | IV | 252 | 2 | 84 | Good | Good | 1.2 | 0.72 | 1.44 | 1.2 | 0.24 |
| Example 9 | | 420 | 420 | CV | 105 | 2 | 52.5 | Good | Good | 1.0 | 0.25 | 0.5 | 0.5 | 0.125 |
| Example 10 | | 420 | 378 | CV | 189 | 2 | 94.5 | Good | Good | 0.9 | 0.45 | 0.9 | 1.0 | 0.225 |

TABLE 1-continued

| Symbol | Screw diameter D | Measurement stroke S | Starvation section H | Inlet port of inert gas | Interval of inlet ports P | Number of inlet ports N | Position of inlet port in starvation section (*1) A | Foam state | Length of screw Entire machine length | H/S | P/S | P × N/S | P × N/H | A/S |
|---|---|---|---|---|---|---|---|---|---|---|---|---|---|---|
| Example 11 | | 420 | 294 | CV | 126 | 4 | 63 | Good | Excellent Shorten by 0.3S | 0.7 | 0.3 | 1.2 | 1.71 | 0.15 |
| Example 12 | 40 | 180 | 180 | IV | 120 | 2 | 30 | Good | Good | 1.0 | 0.67 | 1.33 | 1.33 | 0.167 |
| Comparative Example 1 | 84 | 252 | 420 | CV | — | 1 | 42 | Good | Good | 1.7 | — | — | — | 0.167 |
| Comparative Example 2 | | 420 | 420 | OFP | — | 1 | −42 | No foam | Good | 1.0 | — | — | — | −0.1 |
| Comparative Example 3 | | 420 | 672 | OFP | — | 1 | 42 | Good | Poor Lengthen by 0.6S | 1.6 | — | — | — | 0.1 |
| Comparative Example 4 | | 420 | 420 | OFP | 252 | 2 | 84 | No foam | Good | 1.0 | 0.6 | 1.2 | 1.2 | 0.2 |
| Comparative Example 5 | | 420 | 420 | CV | 420 | 2 | 0 | Diameter of bubble bit large | Good | 1.0 | 1 | 2 | 2 | 0 |
| Comparative Example 6 | | 420 | 168 | CV | 252 | 2 | −42 | No foam | Excellent Shorten by 0.6S | 0.4 | 0.6 | 1.2 | 3 | −0.1 |
| Comparative Example 7 | | 350 | 420 | CV | — | 1 | 28 | Diameter of bubble bit large | Good | 1.2 | — | — | — | 0.08 |
| Comparative Example 8 | 40 | 180 | 180 | CV | — | 1 | −20 | Diameter of bubble bit large | Good | 1.0 | — | — | — | −0.111 |

In Table 1, CV denotes a check valve, IV denotes an inlet valve, AV denotes an automatic valve, and OFP denotes an open flow path. Further, in Table 1, (*1) indicates how far the gas inlet ports 17 and 18 are separated from the two ends of the starvation section 13 at the maximum during the measurement. During the measurement, positions of one or a plurality of gas inlet ports 17, 18, and so on relative to the starvation section 13 are changed. Therefore, at each timing during the measurement, attention is focused on the gas inlet ports 17, 18, and so on positioned closest to the center of the starvation section 13. At a certain timing during the measurement, for example, the gas inlet port 17 on one hand is closest to the center of the starvation section 13, and at another timing, the gas inlet port 18 on the other hand is closest to the center of the starvation section 13. Thus, at each timing during the measurement, shortest distances from the two ends of the starvation section 13 to one of the gas inlet ports 17, 18, and so on positioned closest to the center of the starvation section 13 are summarized as *1. When this numerical value is a positive value, it means that at least one of the gas inlet ports 17, 18, and so on enters the starvation section 13, and always enters the inner side from the two ends of the starvation section 13 by the positive value during the measurement. On the other hand, a negative value indicates that all gas inlet ports 17, 18, and so on are out of the starvation section 13 during the measurement.

In Table 1, an item "H/S" indicates a ratio of the length H of the starvation section 13 to the measurement stroke S, an item "P/S" indicates a ratio of the interval P of the gas inlet ports to the measurement stroke S, an item "P×N/S" indicates a ratio of the product P×N of the interval P of the gas inlet ports and the number N of the gas inlet ports to the measurement stroke S, an item "P×N/H" indicates a ratio of the product P×N of the interval P of the gas inlet ports and the number N of the gas inlet ports to the length H of the starvation section 13, and an item "A/S" indicates a ratio of the length in *1 to the measurement stroke S.

As an additional test, a test of the foam molding using a mold was performed as Examples 1' to 10' under the same conditions as in Examples 1 to 10. That is, using a spigot mold in which a volume of a cavity can be freely set by an opening amount of the mold, an appropriate opening amount of the mold was set so as to match a set injection stroke, and all other conditions were the same as in Examples 1 to 10 to mold the foam molded product. Under any conditions, the gas inlet ports 17, 18, and so on are disposed so that one or more gas inlet ports 17, 18, and so on enter the inner side within the range of 0.1S or more from the two ends of the starvation section 13 during the measurement stroke, and the gas is stably supplied avoiding a transition section. As a result, all foam molded products obtained as Examples 1' to 10' were uniformly foamed and good.

As can be read from Table 1, the screw 3 of the injection molding machine 1 used in the test has only two types of screw diameters D of 84 mm and 40 mm. That is, a test with respect to the other screw diameter D is not performed. However, even when the screw diameters D are different, an effect of the present disclosure can be achieved even when the screw diameters D are different if two or more gas gas inlet ports are provided, the check valve or the opening and closing mechanism is provided in each of the plurality of gas gas inlet ports, and the product P×N of the interval P of the gas inlet ports and the number N of the gas inlet ports is 0.5H or more and 1.71H or less with respect to the length H of the starvation section 13. Generally, when designing a screw having a specific shape so as to achieve a specific effect in the injection molding machine, a length of each portion, for example, a length L of the screw, the length H of the starvation section 13, lengths L1, L2, and so on of the other portions are determined by a ratio with the screw diameter D. Then, when scaling up or down to increase or decrease the screw diameter D, the length of each portion is determined by multiplying the ratio by the screw diameter D. This is because the same effect can be achieved. That is, it is common general knowledge that if a ratio of the length of each portion to the screw diameter D is the same, the same effect can be achieved. In Table 1 above, each of the items "HIS", "P/S", "P×N/S", and "A/S" is a ratio based on the measurement stroke S, and the screw diameter D is not taken as a reference. However, it can be said that the measurement stroke S itself is a length that can be expressed by a ratio with the screw diameter D as the reference. Then, the ratio of these items in Table 1 can be indicated substantially with the screw diameter D as the reference. From the above, it can be seen that, even if the screw diameter D is a screw not shown in Table 1, the same effect as that of the screw 3 according to the present disclosure can be achieved if the length of each portion is determined based on the ratio of these items.

In Examples 1 to 12 and Comparative Examples 1 to 8, the measurement stroke S is not necessarily the maximum measurement stroke in the injection molding machine 1. However, in design of the injection molding machine 1, the measurement stroke S shown in Examples 1 to 12 should be considered as the maximum measurement stroke. If the maximum measurement stroke exceeds the measurement stroke S, since the gas supply port approaches the transition region at a start portion and an end portion of the starvation section 13, supply of the inert gas is reduced and quality of the molded product is adversely affected.

The injection molding machine 1 according to the present illustrative embodiment can be modified in various ways. For example, as performed in the above experiment, instead of the check valves 20 and 21, the gas inlet ports 17 and 18 may be provided with the opening and closing mechanism including the inlet valves as described in the Example 4 and Example 5. Alternatively, as described in Example 6 and Example 7, the opening and closing mechanism including the automatic valve may be provided in the pipeline that supplies the inert gas to the gas inlet ports 17 and 18. The opening and closing mechanism can be opened and closed by a controller, and is opened and closed according to a position of the screw 3. Then, when the gas inlet ports 17 and 18 enter the starvation section 13, the opening and closing mechanism can be opened, and when the gas inlet ports 17 and 18 are out of the starvation section 13, the opening and closing mechanism can be closed, and the backflow of the resin in the gas inlet ports 17 and 18 can be reliably prevented. Other modifications are possible, and as described above, three or more gas inlet ports 17 and 18 may be provided. Alternatively, the check valve and the opening and closing mechanism may be provided at the same time. In addition, three or more gas inlet ports may be disposed at different pitches, or arrangement of the N gas inlet ports may be eccentric to the upstream side or the downstream side with respect to the starvation section 13. Further, a flight of the screw 3 can also be modified, and can be selected from various flights such as a single flight and a double flight.

Although the invention made by the present inventor is specifically described above based on the illustrative embodiment, it is needless to say that the present invention is not limited to the illustrative embodiment described above, and various modifications can be made without departing from the scope of the present invention. A plurality of examples described above can be implemented in combination as appropriate.

What is claimed is:

1. An injection molding machine for foam molding, comprising:

a heating cylinder;

a screw disposed in the heating cylinder; and a plurality of inlet portions provided at a plurality of positions spaced apart from each other in an axial direction in the heating cylinder and configured to introduce inert gas, wherein an inside of the heating cylinder is divided into a first stage on an upstream side of the screw and a second stage on a downstream side of the screw, wherein the first stage comprises a supply section on the upstream side of the first stage in which a resin is melted, a first compression section on the downstream side of the first stage in which a molten resin is compressed, and a first measurement section on the most downstream side of the first stage, wherein the second stage comprises a starvation section on the upstream side of the second stage in which a pressure of the resin is decreased, a second compression section on the downstream side of the second stage in which the molten resin is compressed, and a second measurement section on the most downstream side of the second stage, and wherein the inert gas from the plurality of inlet portions is supplied in the starvation section, wherein each of the plurality of inlet portions is provided with a check valve or an opening and closing mechanism, wherein a product P×N of an interval P of the plurality of inlet portions and a number N of the inlet portions is 0.5H or more and 1.71H or less with respect to a length H of the starvation section, wherein in a state in which more than two inlet portions of the plurality of inlet portions are provided, a distance of the interval P between adjacent inlet portions is identical to a distance between other adjacent inlet portions, wherein the plurality of inlet portions are disposed so that at least one inlet portion is present on an inner side in a range of 0.1S or more from two ends of the starvation section in a period from start to completion of a measurement, a measurement stroke S being a length of the screw moving backwards at a time of measurement, wherein the interval P of the plurality of inlet portions is 0.25S or more and 0.8S or less with respect to the measurement stroke S, wherein the product P×N of the interval P of the plurality of inlet portions and the number N of the inlet portions is 0.5S or more and 1.6S or less with respect to the measurement stroke S, wherein the number N of the plurality of inlet portions is two or more and four or less, wherein a quotient P/H of the interval P of the plurality of inlet portions and the length H of the starvation section is between 0.4 or more and 0.8 or less, and wherein the plurality of inlet portions are arranged eccentric to an upstream side or a downstream side with respect to the starvation section.

2. The injection molding machine for foam molding according to claim 1, wherein the length H of the starvation section is 0.7S or more and 1.2S or less with respect to a measurement stroke S, and wherein at least one of the plurality of inlet portions enters the starvation section in the measurement stroke.

3. An injection molding machine for foam molding, comprising:

a heating cylinder;

a screw disposed in the heating cylinder; and a plurality of inlet portions provided at a plurality of positions spaced apart from each other in an axial direction in the heating cylinder and configured to introduce inert gas, wherein an inside of the heating cylinder is divided into a first stage on an upstream side of the screw and a second stage on a downstream side of the screw, wherein the first stage comprises a supply section on the upstream side of the first stage in which a resin is melted, a first compression section on the downstream side of the first stage in which a molten resin is compressed, and a first measurement section on the most downstream side of the first stage, wherein the second stage comprises a starvation section on the upstream side of the second stage in which a pressure of the resin is decreased, a second compression section on the downstream side of the second stage in which the molten resin is compressed, and a second measurement section on the most downstream side of the second stage, and wherein the inert gas from the plurality of inlet portions is supplied in the starvation section, wherein each of the plurality of inlet portions is provided with an opening and closing mechanism, and the opening and closing mechanism is controlled to be opened and closed based on a position of the screw, wherein a product P×N of an interval P of the plurality of inlet portions and a number N of the inlet portions is 0.5H or more and 1.71H or less with respect to a length H of the starvation section, wherein in a state in which more than two inlet portions of the plurality of inlet portions are provided, a distance of the interval P between adjacent inlet portions is identical to a distance between other adjacent inlet portions, wherein the plurality of inlet portions are disposed so that at least one inlet portion is present on an inner side in a range of 0.1S or more from two ends of the starvation section in a period from start to completion of a measurement, a measurement stroke S being a length of the screw moving backwards at a time of measurement, wherein the interval P of the plurality of inlet portions is 0.25S or more and 0.8S or less with respect to the measurement stroke S, wherein the product P×N of the interval P of the plurality of inlet portions and the number N of the inlet portions is 0.5S or more and 1.6S or less with respect to the measurement stroke S, wherein the number N of the plurality of inlet portions is two or more and four or less, wherein a quotient P/H of the interval P of the plurality of inlet portions and the length H of the starvation section is between 0.4 or more and 0.8 or less, and wherein the plurality of inlet portions are arranged eccentric to an upstream side or a downstream side with respect to the starvation section.

4. The injection molding machine for foam molding according to claim 3, wherein the opening and closing mechanism comprises a plurality of needle type inlet valves configured to open and close a respective one of flow paths connected to a respective one of the plurality of inlet portions for supplying the inert gas.

5. The injection molding machine for foam molding according to claim 3, wherein the opening and closing mechanism comprises a plurality of automatic valves configured to open and close a respective one of flow paths connected to a respective one of the plurality of inlet portions for supplying the inert gas.

6. The injection molding machine for foam molding according to claim 3, wherein in a case the screw is moved to a position where the inlet portion enters an inner side at 0.1S or more from two ends of the starvation section with respect to a measurement stroke S, which is a length of the screw moving backward at a time of measurement, the respective opening and closing mechanism is opened, and wherein in a case the screw is moved to a position where the inlet portion is out of the starvation section, the respective opening and closing mechanism is closed.

7. The injection molding machine for foam molding according to claim 3, wherein the length H of the starvation section is 0.7S or more and 1.2S or less with respect to the measurement stroke S, and wherein at least one of the plurality of inlet portions enters the starvation section in the measurement stroke.

* * * * *